US011047311B2

(12) United States Patent
Bousfield et al.

(10) Patent No.: US 11,047,311 B2
(45) Date of Patent: Jun. 29, 2021

(54) CORE DUCT ASSEMBLY

(71) Applicant: ROLLS-ROYCE plc, London (GB)

(72) Inventors: Ian J Bousfield, Nottingham (GB); Duncan A MacDougall, Derby (GB)

(73) Assignee: ROLLS-ROYCE plc, London (GB)

( * ) Notice: Subject to any disclaimer, the term of this patent is extended or adjusted under 35 U.S.C. 154(b) by 232 days.

(21) Appl. No.: 16/437,283

(22) Filed: Jun. 11, 2019

(65) Prior Publication Data

US 2020/0291862 A1 Sep. 17, 2020

(30) Foreign Application Priority Data

Mar. 14, 2019 (GB) .................................... 1903466

(51) Int. Cl.
| | |
|---|---|
| F02C 7/04 | (2006.01) |
| F01D 25/02 | (2006.01) |
| F02C 7/30 | (2006.01) |
| F02C 3/06 | (2006.01) |
| F01D 5/14 | (2006.01) |

(52) U.S. Cl.
CPC .............. F02C 7/30 (2013.01); F01D 5/143 (2013.01); F01D 25/02 (2013.01); F02C 3/06 (2013.01); F02C 7/04 (2013.01); F05D 2240/30 (2013.01)

(58) Field of Classification Search
CPC ...... F02C 7/04; F02C 7/05; F02C 7/30; F02C 7/32; F02C 7/36; F02C 7/052; B64D 33/02; B64D 2033/0226; B64D 2033/0286; B64D 2033/0246; F01D 25/02; F01D 21/10
See application file for complete search history.

(56) References Cited

U.S. PATENT DOCUMENTS

| | | | | |
|---|---|---|---|---|
| 3,814,549 A | * | 6/1974 | Cronstedt | F01D 25/04 417/406 |
| 3,907,386 A | * | 9/1975 | Kasmarik | F02C 7/06 384/559 |
| 4,827,712 A | * | 5/1989 | Coplin | F02K 3/06 415/210.1 |
| 7,882,693 B2 | * | 2/2011 | Schilling | F02K 3/072 60/204 |
| 9,957,918 B2 | * | 5/2018 | Suciu | F02C 7/20 |
| 10,690,147 B2 | * | 6/2020 | Hiernaux | F02C 7/14 |
| 10,746,102 B2 | * | 8/2020 | Pointon | F01D 25/24 |
| 2008/0098717 A1 | * | 5/2008 | Orlando | F01D 1/24 60/226.1 |
| 2010/0170224 A1 | * | 7/2010 | Clark | F01D 5/145 60/264 |
| 2019/0048826 A1 | * | 2/2019 | Pointon | F02C 7/04 |

* cited by examiner

*Primary Examiner* — Jason H Duger
*Assistant Examiner* — Todd N Jordan
(74) *Attorney, Agent, or Firm* — Oliff PLC (57) ABSTRACT

A core duct assembly for a gas turbine engine, the core duct assembly including: a core duct including an outer and an inner wall, the outer wall having an interior surface; a gas flow path member extending across the gas flow path at least partly between the inner and outer walls, the rotor blade having a radial span extending from a blade platform to a blade tip, wherein an upstream wall axis is defined as an axis tangential to a point on a first portion of the interior surface of the outer wall of the core duct extending downstream from the gas flow path member, the upstream wall axis lying in a longitudinal plane of the gas turbine engine containing the rotational axis of the engine, and wherein the upstream wall axis intersects the rotor blade at a point spaced radially inward from the blade tip of the rotor blade.

3 Claims, 3 Drawing Sheets

CORE DUCT ASSEMBLY

The present disclosure relates to a core duct assembly. In particular, a core duct assembly for a gas turbine engine.

When a gas turbine engine operates in ice forming conditions ice can accrete on various engine components. The ice formed may include super-cooled water ice or high altitude ice crystals. Ice may in particular accrete on static vanes that are located within a core duct near the front of a compressor provided in the gas turbine engine. Any accreted ice may be shed during operation of the engine because of aerodynamic loading or vibration. Any ice that is shed flows down the gas path through the core duct. In the case of ice formed on a compressor static vane the ice is ingested by the compressor rotor stage that is immediately downstream of the static vane. This may cause damage to the rotor blades of the compressor rotor stage. This may especially be a problem if ice released from the static vane is propelled along the interior wall of the core duct and strikes a distal tip of the rotor blade.

In order to mitigate damage caused by ice impact there are two known approaches. A first known approach involves designing the rotor blades of the compressor to withstand the impact event without any significant damage occurring. A second known approach involves reducing the accreted ice threat. This may be achieved by heating the static vane to reduce the amount of ice that can be formed.

Despite these known solutions, further improvements in mitigating damaged caused by ingested ice are desired.

According to a first aspect there is provided a core duct assembly for a gas turbine engine, the core duct assembly comprising:

a core duct comprising an outer wall and an inner wall, the outer wall having an interior surface, the core duct defining a gas flow path;

a gas flow path member extending across the gas flow path at least partly between the inner and outer walls;

at least one rotor blade located downstream of the gas flow path member within the gas flow path, the rotor blade having a radial span extending from a blade platform to a blade tip, wherein an upstream wall axis is defined as an axis tangential to a point on a first portion of the interior surface of the outer wall of the core duct extending downstream from the gas flow path member, the upstream wall axis lying in a longitudinal plane of the gas turbine engine containing the rotational axis of the engine, and wherein the upstream wall axis intersects the rotor blade at a point spaced radially inward from the blade tip of the rotor blade.

By shaping the interior surface of the bypass duct so that the upstream wall axis intersects the rotor blade away from its tip a turning point (e.g. a convex profile) in the shape of the interior surface may be formed. This may help cause ice that has been shed at the gas flow path member to separate from the interior surface as it travels down the core duct and impact the rotor blade at a point further from its radial tip. This may help to reduce the risk of damage caused by ice striking the rotor blade.

The at least one rotor blade and the gas flow path member may both be provided as part of a compressor of the gas turbine engine (e.g. the same compressor where there is more than one). The at least one rotor blade may therefore be a compressor rotor blade and the gas flow path member may be a (variable or static) stator vane.

The compressor may comprise a plurality of stages, each stage comprising a row of rotor blades and a row of stator vanes that are off set relative to one another along the gas flow path. The gas flow path member may form one of the vanes (e.g. a variable or static vane) provided in a first stage of the compressor, and the at least one rotor blade may be provided in a second stage of the compressor (e.g. such that the second stage is down stream of the first). The first portion of the interior surface of the outer wall of the core duct may therefore be provided between different stages of the compressor.

An intersection distance may be defined as the radial distance between: a point radially level with the intersection of the upstream wall axis and a leading edge of the rotor blade; and the radial tip of the leading edge of the rotor blade.

The intersection distance may be at least 10% of the radial span of the rotor blade. More specifically the intersection distance may be in the range between 10% and 50% of the radial span of the rotor blade The intersection distance may be in the range between 20 mm and 80 mm.

The interior surface of the core duct outer wall may comprise a second portion downstream of the first portion, the second portion being formed by a portion of the interior surface having a convex profile.

The second portion may extend along the core duct between an upstream boundary and a downstream boundary.

The gas flow path member may have a leading edge and a trailing edge.

The first portion of the interior surface of the core duct outer wall may form a non-convex portion extending between: an intersection of the trailing edge of the gas flow path member and the interior surface; and the upstream boundary of the second portion.

An acceleration distance may be is defined as: the distance along the interior surface of the core duct outer wall between the intersection of the trailing edge of the gas flow path member and the interior surface; and a point on the upstream boundary of the second portion.

The second portion may have a centre point midway between the upstream boundary and the downstream boundary. A separation distance may be defined as: the axial distance between the centre point of the second portion and an axial position level with the radial tip of the leading edge of the rotor blade.

A ratio defined as:

$$\frac{\text{the acceleration distance } (a)}{\text{the seperation distance } (b)}$$

may be in a range between 0.13 and 2. More specifically it may be between 0.13 and 2.00.

A downstream wall axis may be defined as an axis tangential to the interior surface of the core duct outer wall at a point on the interior surface level with the radial tip of the leading edge of the rotor blade. The downstream wall axis may lie in a longitudinal plane of the gas turbine engine containing the rotational axis of the engine.

A trajectory angle may be defined as the angle extending between the upstream wall axis and the downstream wall axis.

A ratio defined as:

$$\frac{\text{the acceleration distance } (a)}{\text{the trajectory angle } (\phi)}$$

may be in a range between 0.25 mm/degree and 3.33 mm/degree.

A ratio defined as:

$$\frac{\text{the seperation distance } (b)}{\text{the trajectory angle } (\phi)}$$

may be in a range between 0.63 mm/degree and 5 mm/degree. More specifically it may be between 0.63 mm/degree and 5.00 mm/degree.

A ratio defined as:

$$\frac{(\text{the acceleration distance } (a)/\text{the seperation distance } (b))}{\text{the trajectory angle } (\phi)}$$

may be in a range between 0.0033 degree$^{-1}$ and 0.13 degree$^{-1}$.

The acceleration distance may be at least 10 mm. More specifically, the acceleration distance may be in a range between 10 mm and 50 mm. Yet more specifically, the acceleration distance may be in a range between 20 mm and 40 mm.

The separation distance may be at least 25 mm. More specifically, the separation distance may be in a range between 25 mm and 75 mm. Yet more specifically the separation distance may be in a range between 35 mm and 55 mm.

The trajectory angle may be in a range between 15 degrees and 40 degrees. More specifically it may be in a range between 20 degrees and 30 degrees.

The first portion of the duct outer wall may comprise an upstream portion and a downstream portion. The upstream wall axis may be a first upstream wall axis defined at a point on the downstream portion. A second upstream wall axis may be defined as an axis tangential to a point on the upstream portion. The second upstream axis may lie in a longitudinal plane of the gas turbine engine containing the rotational axis of the engine. The first upstream wall axis may extend at a greater angle relative to an axis parallel to the rotational axis of the gas turbine engine compared to that of the second upstream axis.

The gas flow path member may be a vane (e.g. static or variable vane), or a strut.

According to a second aspect there is provided a core duct assembly for a gas turbine engine, the core duct assembly comprising:

a core duct comprising an outer wall and an inner wall, the outer wall having an interior surface, the core duct defining a gas flow path;

a gas flow path member extending across the gas flow path at least partly between the inner and outer wall;

at least one rotor blade located downstream of the gas flow path member within the gas flow path, wherein the interior surface of the core duct outer wall comprises a convex portion downstream of the gas flow path member, the convex portion being formed by a portion of the interior surface having a convex profile.

The at least one rotor blade and the gas flow path member may both be provided as part of a compressor of the gas turbine engine. The at least one rotor blade may therefore be a compressor rotor blade and the gas flow path member may be a (variable or static) stator vane.

The compressor may comprise a plurality of stages, and the convex portion of the core duct may be provided between different stages of the compressor.

According to a third aspect, there is provided a gas turbine engine for an aircraft comprising:

an engine core comprising a turbine, a compressor, and a core shaft connecting the turbine to the compressor;

fan located upstream of the engine core, the fan comprising a plurality of fan blades;

wherein the engine core comprises the core duct assembly of the first or second aspect, the at least rotor blade being a rotor blade provided in the compressor. The gas flow path member may also be provided as part of the compressor, and may be a (static or variable) stator vane.

The gas turbine engine may further comprise a gearbox that receives an input from the core shaft and outputs drive to the fan so as to drive the fan at a lower rotational speed than the core shaft.

Any features disclosed in connection with the first aspect may be used in combination with the second aspect, and vice versa.

As used herein, a range "from value X to value Y" or "between value X and value Y", or the like, denotes an inclusive range; including the bounding values of X and Y. As used herein, the term "axial plane" denotes a plane extending along the length of an engine, parallel to an axial centreline of the engine, and the term "radial plane" denotes a plane extending perpendicular to the axial centreline of the engine, so including all radial lines at the axial position of the radial plane. Axial planes may also be referred to as longitudinal planes, as they extend along the length of the engine. A radial distance or an axial distance is therefore a distance in a radial or axial plane, respectively.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350cm, 360cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}s$, 105 $Nkg^{-1}s$, 100 $Nkg^{-1}s$, 95 $Nkg^{-1}s$, 90 $Nkg^{-1}s$, 85 $Nkg^{-1}s$ or 80 $Nkg^{-1}s$. The specific thrust may be in an inclusive range bounded by any two of the values in the previous sentence (i.e. the values may form upper or lower bounds), for example in the range of from 80 $Nkg^{-1}s$ to 100 $Nkg^{-1}s$, or 85 $Nkg^{-1}s$ to 95 $Nkg^{-1}s$. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached.

Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 1:
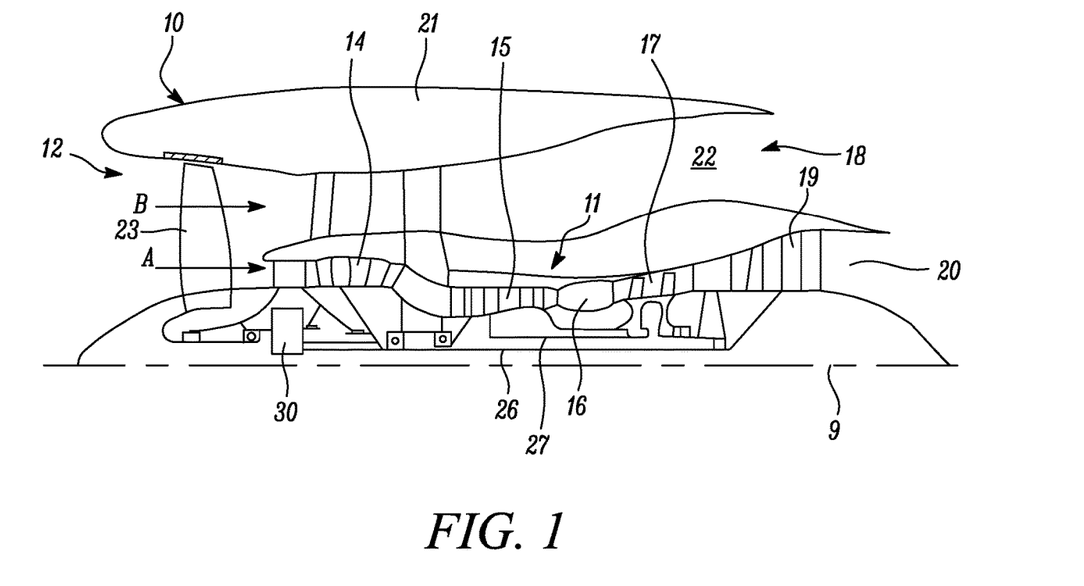
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is com busted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
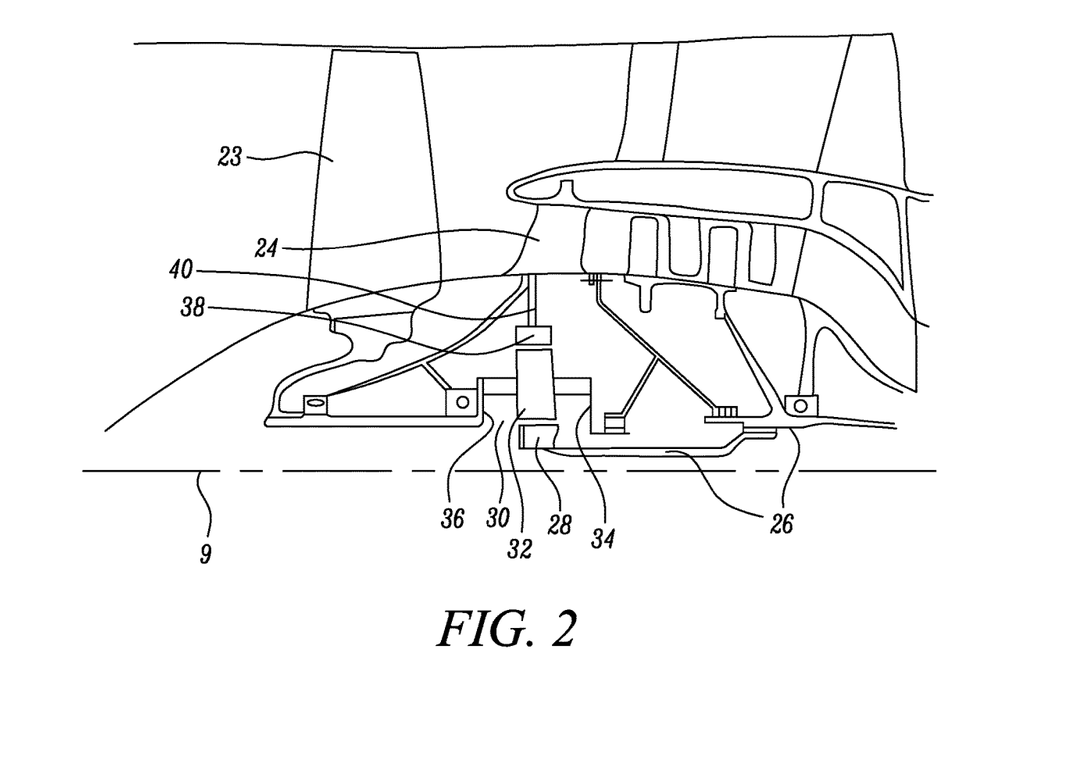
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
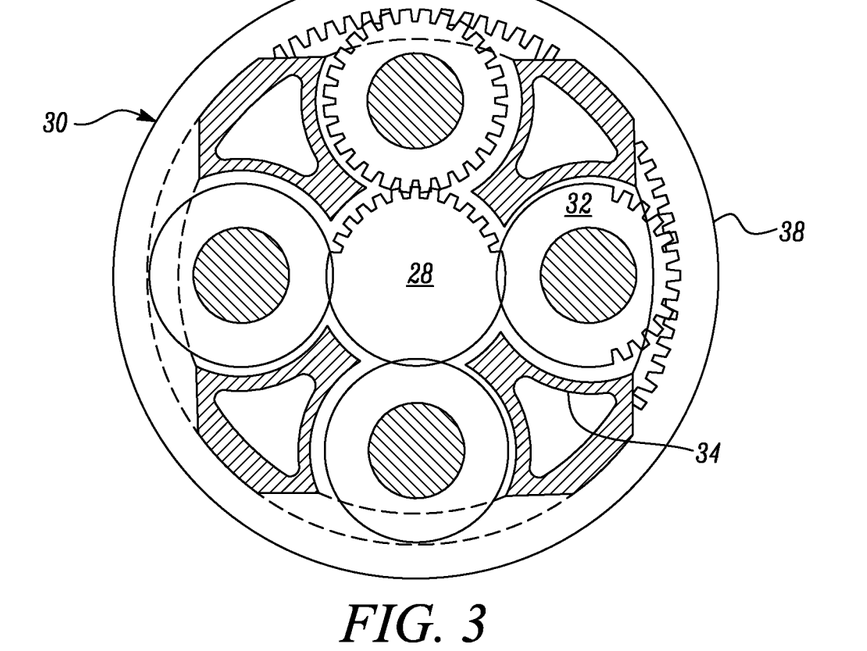
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
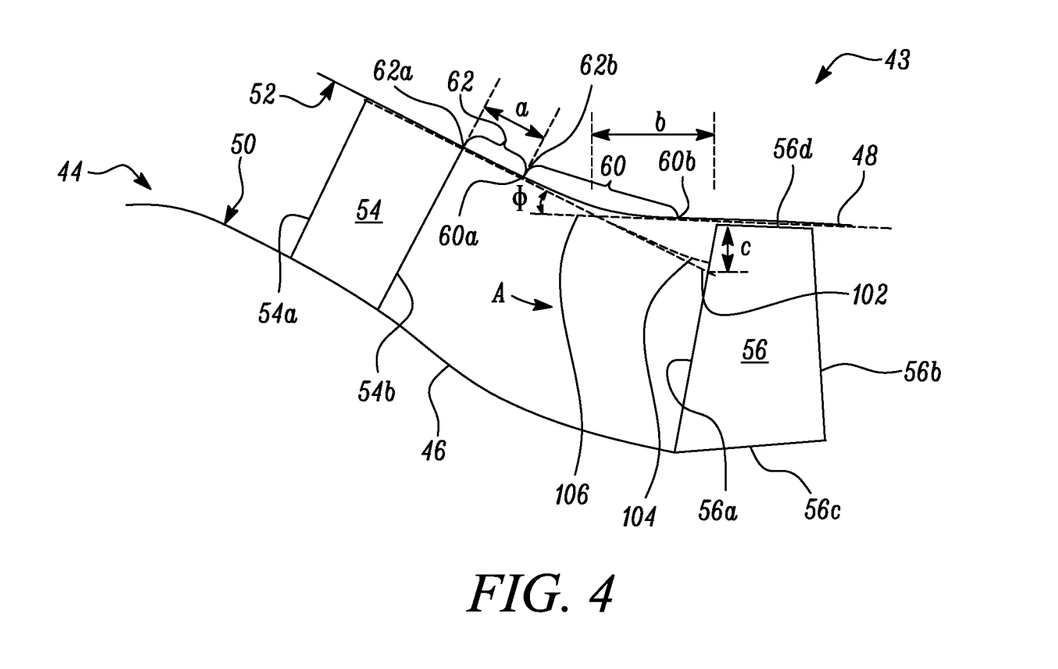
FIG. 4 shows a sectional side view of a core duct assembly of the gas turbine engine according to an embodiment.

FIG. 4 illustrates a core duct assembly 43 that forms part of the engine core 11 of the gas turbine engine 10. The core duct assembly 43 comprises a core duct 44 that defines a gas flow path through the engine core 11. The gas flow path runs through the compressors, combustion equipment and turbines described above and so carries the core airflow A through the gas turbine engine.

The core duct 44 comprises an inner wall 46 and an outer wall 48. Between the inner and outer walls 46, 48 a generally annular gas flow path is defined. The inner and outer walls 46, 48 have respective interior surfaces 50, 52 arranged to confine gas within the gas flow path.

The core duct assembly 43 further comprises a gas flow path member extending within the gas flow path. In the present embodiment, the gas flow path member is a vane 54 (e.g. a static or variable vane). The gas flow path member may however be any structure extending at least partly across the gas flow path, including any type of vane, support strut or similar structure. The gas flow path member extends across the gas flow path at least partly between the interior surfaces 50, 52 of the core duct 44. In the described embodiment, the vane 54 extends all of the way across the gas flow path. In other embodiments, it may extend only part of the way across the core duct 44. In that case, it may extend from the interior surface 52 of the outer wall 48. The vane 54 has a leading edge 54a and a trailing edge 54b relative to the direction of gas flow through the core duct 44.

The core duct assembly 43 further comprises at least one rotor blade 56. The rotor blade may be one of a plurality of rotor blades provided in the low pressure compressor 14 or high-pressure compressor 15 described above. In the present embodiment the rotor blade 56 is provided in the low pressure compressor 14 (i.e. the lowest pressure compressor, which may be termed the intermediate pressure compressor) and located downstream of the vane 54. The rotor blade 56 is one of an array of rotor blades driven by the shaft 24 provided in the engine core as described above. The rotor blade 56 extends within the gas flow path so as to provide compression of the core airflow A. In other embodiments, the rotor blade may be a rotor blade of any of the other compressors provided in the engine. The rotor blade may, for example, be provided as part of the high pressure compressor 15.

The low pressure compressor 14 comprises any number of stages, for example multiple stages. Each stage comprises a row of rotor blades and a row of stator vanes. The row of rotor blades and the row of stator vanes are axially offset from each other. In the presently described embodiment, the rotor blade 56 is provided in the first stage, i.e. in the most upstream stage, of the low pressure compressor 14, and the vane 54 is an inlet guide vane, or a strut, provided upstream of the rotor blade 56 in the core duct 44. The vane 54 may be a variable or static inlet guide vane.

In yet other embodiments, the rotor blade 56 may be provided in the high pressure compressor, rather than the lower pressure compressor. The high pressure compressor 15 comprises any number of stages, for example multiple stages. Each stage comprises a row of rotor blades and a row of stator vanes. The row of rotor blades and the row of stator vanes are axially offset from each other. The rotor blade 56 may be provided in the first stage, i.e. in the most upstream stage, of the high pressure compressor 15, and the vane 54 is a vane, or a strut, provided upstream of the rotor blade 56 in the core duct 44. The vane 54 may be a variable or static inlet guide vane, for example a vane of the last stage, i.e. the most downstream stage, of the low pressure compressor 14, or an additional vane provided downstream of the low pressure compressor 14 in the core duct 44.

The features described in combination with the low pressure compressor may therefore apply equally to the high pressure compressor, or any other compressor provided in the engine.

The rotor blade has a leading edge 56a and a trailing edge 56b relative to the direction of gas flow through the core duct 44. The rotor blade 56 extends in a radial direction between a blade root or platform 56c and a radially outer blade tip 56d. In the present embodiment, the rotor blade 56 is an unshrouded blade and the blade tip 56d is spaced from the interior surface 52 of the core duct outer wall 48. In other embodiments, the rotor blade may be shrouded. In such an embodiment, the blade tip is defined as the radially outer extent of the aerofoil or gas-washed surface formed by the rotor blade (i.e. the point wherein the leading edge 56a intersects the shroud).

Referring again to FIG. 4, an upstream wall axis 102 is defined as an axis tangential to a point on a first portion 60 of the interior surface 52 of the outer wall 48 of the core duct 44. The first portion is a portion extending downstream from the vane 54, and is upstream of the rotor blade 56. The upstream wall axis 102 lies in a longitudinal plane of the gas turbine engine 10 containing the rotational axis 9 of the engine (i.e. the longitudinal plane is the cross section plane of FIG. 2). The upstream wall axis 102 intersects the rotor blade 56 at a point spaced radially inward from the blade tip of the rotor blade (e.g. distance 'c' labelled in FIG. 4).

During use of the gas turbine engine ice may be accreted on the vane 54 (or any other structure forming the gas flow path member) at a position at or near to the core duct outer wall 48. When this ice is shed, the gas flow through the core duct 44 will accelerate the ice rearwards along the core airflow path A. Where the shape of the interior surface 52 of the outer wall is straight (e.g. conical) or concave, the ice will be accelerated along the interior surface whist remaining close to or in contact with it. By shaping the interior surface of the bypass duct so that the upstream wall axis intersects the rotor blade away from its tip a turning point (e.g. a convex profile) in the shape of the interior surface may be formed. This may create a separation point at which the ice that has been shed at the vane 54 becomes separated from the interior surface 52 as it travels down the core duct 44.

Once the ice has been separated, despite the gas stream vector remaining parallel to the direction of the core duct 44, the momentum gained by the piece of ice carries it away from the interior surface 52 of the outer wall 48 in an almost straight trajectory. After the piece of ice has been separated from the interior surface, the change in acceleration vector will cause some curvature to the flight path of the ice, as shown by the dotted line labelled 104 in FIG. 4, which shows an approximate path of the ice. By following the trajectory shown, the ice will impact the compressor rotor blade 56 at a point closer to the blade platform 56c (in other words, further from the blade tip 56d). At this point the rotor blade 56 is inherently more robust and so damage caused by the impact may be reduced.

An intersection distance, labelled as 'c' in FIG. 4, may be defined as the radial distance between: i) a point radially level with the intersection of the upstream wall axis 102 and the leading edge 56a of the compressor rotor blade 56; and ii) the radial tip of the leading edge 56a of the compressor rotor blade 56.

In order to provide a desired level of shielding of the compressor blade tip 56b the intersection distance (c) may be at least 10% of the radial span of the compressor rotor blade (and less than 100%). The radial span is defined as the axial distance between the radial tip of the leading edge 56a and the blade platform 56c. A minimum value of 10% may direct ice away from the structurally weaker part of the rotor blade. More specifically, the intersection distance may be in a range between 10% and 50% of the radial span of the compressor rotor blade. This range may provide a suitable level of damage mitigation without significantly affecting the geometry of the engine and/or the compressor rotor blade. For example, above a 50% span position the rotor blade is more likely to have sufficient structural strength to withstand ice impact, whereas achieving a value above 50% is likely to require significant changes in engine and/or compressor rotor blade geometry and may result in reduced performance. In other embodiments, the intersection distance may be in a range between 10% and 40% of the radial span of the compressor blade.

In one embodiment, the value of the intersection distance may be in an inclusive range between 20 mm and 200 mm. In this embodiment, the total span of the rotor blade may be about 200 mm. More specifically, the intersection distance may be in an inclusive range between 20 mm and 80 mm.

In other various embodiments, the intersection distance may be a proportion of the rotor blade span of any of the following: 10%, 15%, 20%, 25%, 30%, 35%, 40%, 45%, 50%, 55%, 60%, 65%, 70%, 75% or 80%. The intersection distance may, for example, be in an inclusive range bounded by any two of the values in the previous sentence (i.e. the values may form upper or lower bounds).

In other various embodiments, intersection distance may be any of the following: 20 mm, 25 mm, 30 mm, 35 mm, 40 mm, 45 mm, 50 mm, 55 mm, 60 mm, 65 mm, 70 mm, 75 mm, or 80 mm. The intersection distance may, for example, be in an inclusive range bounded by any two of the values in the previous sentence (i.e. the values may form upper or lower bounds).

The interior surface 52 of the core duct outer wall 48 extending between the vane 54 and the compressor rotor blade 56 further comprises a second portion 60. The second portion may be a downstream portion that is located downstream of the first, or upstream portion. The second portion 60 is formed by a region of the interior surface 52 which has a convex profile, and so may be termed a convex portion. In the present embodiment, the convex profile is a curvature that is convex in the direction of gas flow through the core duct 44 shown in FIG. 4 (e.g. a direction having a component parallel to the rotational axis of the engine). In other words, a line segment connecting two points on the convex profile lies outside the core duct 44.

The convex portion 60 extends along the gas flow path from an upstream boundary 60a to a downstream boundary 60b. The convex portion 60 further has a centre point midway between the upstream boundary 60a and the downstream boundary 60b.

The first portion of the core duct outer wall 48 forms a non-convex portion 62 extending between an upstream boundary 62a and a downstream boundary 62b. The non-convex portion extends between the intersection of the trailing edge 54b of the vane 54 and the interior surface 52; and the upstream boundary 60a of the convex portion 60. The upstream boundary of the convex portion 60 and the downstream boundary of the non-convex portion 62 therefore coincide. The non-convex portion may extend in a generally straight path angled toward the engine centreline in downstream direction along the core duct 44 as shown in FIG. 4. It may therefore form a conical shape. In other embodiments, the non-convex portion may have a generally concave curved shape in a direction along the core duct 44, i.e. a line segment connecting two points on the non-convex profile lies inside the core duct 44. In other words, the non-convex portion may be straight or have a concave curved shape in the plane of FIG. 4.

The upstream wall axis 102 may be defined as an axis tangential to the interior surface 52 of the core duct outer wall 48 at a point on the upstream boundary 60a of the convex portion 60. The upstream wall axis may however be defined at any other point on the first portion 62 of the interior surface 52.

The trajectory of the ice 104 once it leaves the interior surface 52 of the core duct outer wall 48 may depend on one or more of the following parameters:

i) an acceleration distance (a) along which ice that has been shed can accelerate before separating from the interior surface of the bypass duct;

ii) a separation distance (b) between the centre of the second portion 60 and the leading edge 56a of the rotor blade 56; and iii) a trajectory angle (φ) between the upstream wall axis 102 and the interior surface 52 of the core duct at the compressor rotor blade.

As will be understood by the skilled person, it is desirable to increase the values of the above parameters in order to provide a sufficient intersection distance to mitigate damage to the compressor rotor blade. There are however constraints on the values of the parameters that would otherwise have a negative impact on the engine geometry (e.g. would impact other engine components and the desire for compact core geometry).

Referring again to FIG. 4, the acceleration distance (a) is defined as: i) the distance along the interior surface 52 of the core outer wall 48 between the intersection of the trailing edge 54b of the vane 54 and the interior surface 52; and ii) a point on the upstream boundary 60a of the first portion 60 of the interior wall surface. The acceleration distance is measured in a longitudinal plane of the engine that contains the engine centreline (e.g. the plane of the cross section shown in FIG. 4).

By increasing the acceleration distance, the amount of distance over which ice shed from the vane 54 can be accelerated by gas flow within the core duct is increased. By increasing the speed of the ice as it separates from the interior surface of the core duct the momentum of the ice may be increased, and the curvature of the flight path in a direction away from the centreline of the engine may be reduced (e.g. reducing the curve of trajectory 104 so that it is closer to the path of the upstream axis 102).

In the present embodiment, the acceleration distance (a) is at least 10 mm. This has been found to provide a suitable level of acceleration of ice to reduce the risk of damage to the rotor blade 56 caused by ice impact.

More specifically, the acceleration distance (a) may be in an inclusive range between 10 mm and 50 mm. This may provide a suitable level of ice acceleration, without requiring excessively large values of the acceleration distance, separation distance and the trajectory angle and so still allow compact engine geometry.

Yet more specifically, the acceleration distance (a) may be in an inclusive range between 20 mm and 40 mm. This may provide a particularly advantageous balance of ice acceleration, without impacting the engine geometry.

In various other embodiments, the acceleration distance may be any of the following: 10 mm, 15 mm, 20 mm, 25 mm, 30 mm, 35 mm, 40 mm, 45 mm or 50 mm. The acceleration distance may, for example, be in an inclusive range bounded by any two of the values in the previous sentence (i.e. the values may form upper or lower bounds).

The separation distance (b) is defined as: i) the axial distance between the centre point of the second (i.e. convex) portion 60 and an axial position level with the radial tip of the leading edge 56a of the compressor rotor blade 56. In some embodiments, the region of the core duct outer wall 48 downstream of the convex portion 60 may not be parallel (or approximately parallel) with the engine centre line 9 as illustrated in FIG. 4. In other embodiments, the core duct outer wall 48 may extend towards or away from the engine centre line 9 in a downstream direction following the convex portion 60. Hence the radial distance from the engine centre line 9 to the blade tip 56d may be less or greater than the radial distance from the engine centre line to the centre point of the convex portion 60 from which the separation distance is measured. The separation distance is however measured in an axial direction parallel to the engine centreline in all geometries.

As can be seen in FIG. 4, increasing the separation distance allows the ice to travel further along its trajectory away from the interior surface 52 before it impacts the compressor rotor blade 56. By increasing the separation distance the trajectory of the ice may result in an impact suitably remote from the rotor blade tip 56d. This may therefore help reduce damage in the case of an ice impact.

In the present embodiment, the separation distance (b) is at least 25 mm. This has been found to provide a suitably long trajectory away from the interior surface of the core duct to mitigate rotor blade damage.

More specifically, the separation distance (b) may be in an inclusive range between 25 mm and 75 mm. This may provide suitable ice travel away from the duct wall, without requiring excessively large values of the acceleration distance, separation distance and the trajectory angle and so allowing compact engine geometry.

Yet more specifically, the separation distance (b) may be in an inclusive range between 35 mm and 55 mm. This may provide a particularly advantageous balance of ice flight path without impacting the engine geometry.

In various other embodiments, the separation distance may be any of the following: 25 mm, 30 mm, 35 mm, 40 mm, 45 mm, 50 mm, 55 mm, 60 mm, 65 mm, 70 mm, or 75 mm. The separation distance may, for example, be in an inclusive range bounded by any two of the values in the previous sentence (i.e. the values may form upper or lower bounds).

The trajectory of the ice may be dependent on the relative size of the acceleration distance and the separation distance. For example, a reduction in the speed of the ice may be compensated for by increasing the distance over which it travels before reaching the rotor blade. A ratio may be defined as: the acceleration distance (a) / separation distance (b). In the presently described embodiment, this ratio is in an inclusive range between 0.13 and 2 (e.g. 2.00).

In various other embodiments, the ratio of acceleration distance divided by separation distance (a/b) may be any of the following: 0.13, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9 or 2.0. The ratio of acceleration distance divided by separation distance (a/b) may, for example, be in an inclusive range bounded by any two of the values in the previous sentence (i.e. the values may form upper or lower bounds).

Referring again to FIG. 4, a downstream wall axis 106 is defined as an axis tangential to the interior surface 52 of the core duct outer wall 48 at a point on the interior surface 52 level with leading edge tip of the rotor blade 56. The downstream wall axis 106 lies in a longitudinal plane of the gas turbine engine containing the rotational axis 9.

The trajectory angle ($\phi$) is defined as the angle extending between the upstream wall axis 102 and the downstream axis 104 as shown in FIG. 4 (e.g. the smallest angle measured between them). By increasing the trajectory angle, the direction of travel away from the interior surface of the core duct may be increased. This may help to increase the size of the intersection distance, without requiring excessively large values of the acceleration distance and the separation distance.

In the presently described embodiment, the trajectory angle is in an inclusive range between 15 degrees and 40 degrees.

More specifically, the trajectory angle may be in an inclusive range between 20 degrees and 30 degrees.

In various other embodiments, the trajectory angle may be any of the following: 15 degrees, 20 degrees, 25 degrees, 30 degrees, 35 degrees, or 40 degrees. The acceleration distance may, for example, be in an inclusive range bounded by any two of the values in the previous sentence (i.e. the values may form upper or lower bounds).

The size of the intersection distance may depend on the relative size of the acceleration distance and the trajectory angle. In the presently described embodiment, a ratio defined as the acceleration distance (a)/the trajectory angle ($\phi$) is in an inclusive range between 0.25 mm/degree and 3.33 mm/degree.

The size of the intersection distance may similarly depend on the relative size of the separation distance and the trajectory angle. In the presently described embodiment, a ratio of the separation distance (b)/the trajectory angle ($\phi$) is in an inclusive range between 0.63 mm/degree and 5 mm/degree (e.g. 5.00 mm/degree).

By choosing a core duct interior wall geometry within these ranges a suitable level of damage mitigation may be achieved, without impacting on other engine performance factors.

In various other embodiments, the ratio of acceleration distance divided by trajectory angle (a/$\phi$) may be any of the following: 0.25 mm/degree, 0.50 mm/degree, 0.75 mm/degree, 1.00 mm/degree, 1.25 mm/degree, 1.50 mm/degree, 1.75 mm/degree, 2.00 mm/degree, 2.25 mm/degree, 2.50 mm/degree, 2.75 mm/degree, 3.00 mm/degree, 3.25 mm/degree or 3.33 mm/degree. The ratio of acceleration distance divided by trajectory angle (a/$\phi$) may, for example, be in an inclusive range bounded by any two of the values in the previous sentence (i.e. the values may form upper or lower bounds).

In various other embodiments, the ratio of separation distance divided by trajectory angle (b/$\phi$) may be any of the following: 0.63 mm/degree, 0.75 mm/degree, 2.00 mm/degree, 2.25 mm/degree, 2.50 mm/degree, 2.75 mm/degree, 3.00 mm/degree, 3.25 mm/degree, 3.50 mm/degree, 3.75 mm/degree, 4.00 mm/degree, 4.25 mm/degree, 4.50 mm/degree 4.75 mm/degree or 5.00 mm/degree. The ratio of separation distance divided by trajectory angle (b/$\phi$) may, for example, be in an inclusive range bounded by any two of the values in the previous sentence (i.e. the values may form upper or lower bounds).

As will be understood by the skilled person, the impact point of ice on the rotor blade may be controlled by the choice of the ratio of the acceleration distance, separation distance and trajectory angle. A ratio (referred to as the combined ratio) of these parameters may be defined as:

$$\frac{\text{the acceleration distance } (a)/\text{the seperation distance } (b)}{\text{trajectory angle } (\phi)}$$

In the presently described embodiment, the combined ratio is in an inclusive range between 0.0033 degree$^{-1}$ and 0.13 degree$^{-1}$.

In various other embodiments, the combined ratio may be any of the following: 0.0033 degree$^{-1}$, 0.010 degree$^{-1}$, 0.020 degree$^{-1}$, 0.030 degree$^{-1}$, 0.040 degree$^{-1}$, 0.050 degree$^{-1}$, 0.060 degree$^{-1}$, 0.070 degree$^{-1}$, 0.080 degree$^{-1}$, 0.090 degree$^{-1}$, 0.10 degree$^{-1}$ or 0.13 degree$^{-1}$. The combined ratio may, for example, be in an inclusive range bounded by any two of the values in the previous sentence (i.e. the values may form upper or lower bounds).

In one embodiment, the acceleration distance (a) may be 10 mm, the separation distance (b) may be 43 mm, the trajectory angle ($\phi$) may be 25 degrees and the intersection distance (c) may be 20 mm. This may allow the acceleration distance to be minimised, while still providing a suitable value of the intersection distance.

In another embodiment, the acceleration distance (a) may be 40 mm, the separation distance (b) may be 24 mm, the trajectory angle ($\phi$) may be 40 degrees and the intersection distance (c) may be 20 mm. This may allow the separation distance to be minimised, while still providing a suitable value of the intersection distance.

In yet another embodiment, the acceleration distance (a) may be 30 mm, the separation distance (b) may be 75 mm, the trajectory angle ($\phi$) may be 15 degrees and the intersection distance (c) may be 20 mm. This may allow the trajectory angle to be minimised, while still providing a suitable value of the intersection distance.

Figure 5:
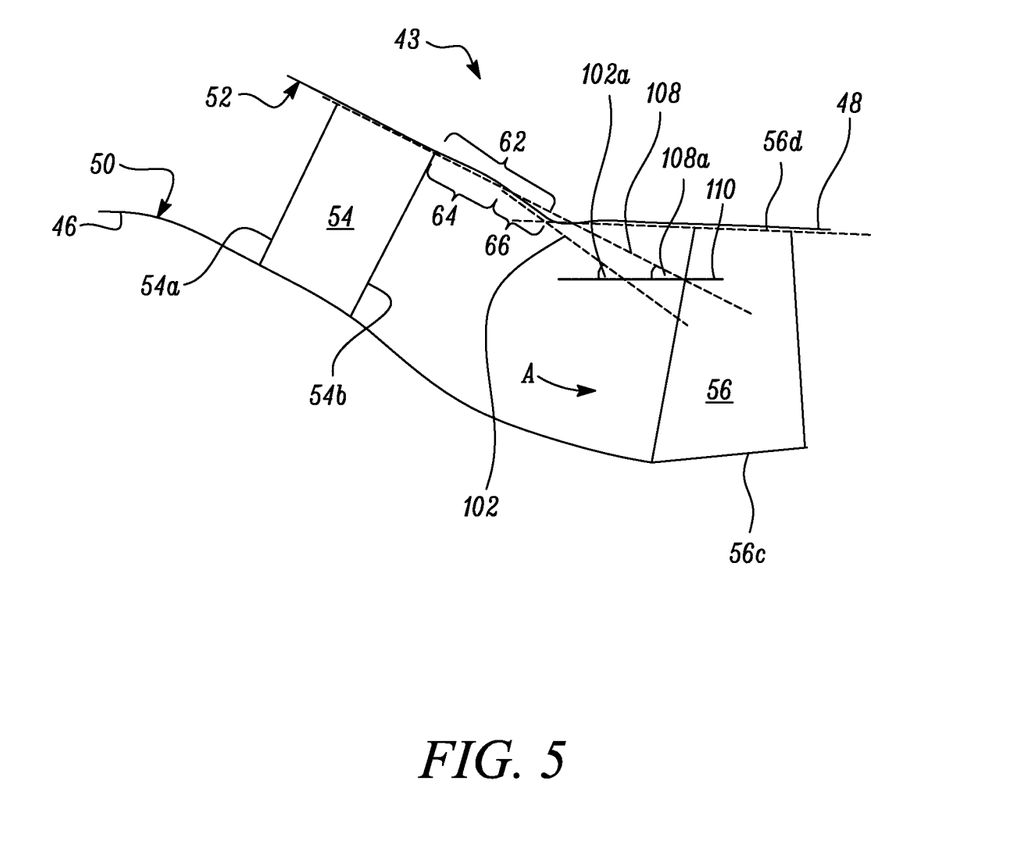
FIG. 5 shows a sectional side view of a core duct assembly according to another embodiment.

In the embodiment shown in FIG. 5, the first (i.e. non-convex) portion 62 of the duct outer wall 48 comprises an upstream portion 64 and a downstream portion 66. In this embodiment, the upstream wall axis 102 is a first upstream wall axis defined at a point on the downstream portion 66 of the outer wall. A second upstream wall axis 108 is defined as an axis tangential to a point on the upstream portion 64. The second upstream wall axis 108 lies in a longitudinal plane of the gas turbine engine 10 containing the rotational axis 9 of the engine similarly to the first upstream wall axis. As can be seen in FIG. 5, the first upstream wall axis 102 extends at an angle 102a relative to an axis 110 parallel to the rotational axis 9 of the gas turbine engine. The second upstream wall axis 108 similarly extends at an angle 108a relative to the axis 110 parallel to the rotational axis 9. The first upstream wall axis 102 extends at a greater angle relative to an axis parallel to the rotational axis 9 of the gas turbine engine compared to that of the second upstream axis 108.

The downstream portion 66 therefore forms a ramp portion of the interior surface 52 of the core duct 44 to provide a greater deflection of ice away from the interior surface of the wall. This may help to move the impact point on the rotor blade further from the blade tip and so reduce this risk of damage cause by ice impact.

The shape of the interior surface of the outer wall shown in FIGS. 4 and 5 are to be understood as examples only. Other shapes may be provided that also allow the upstream wall axis 102 to intersect the rotor blade at a point spaced radially inward from the blade tip of the rotor blade. In some embodiment, for example, the convex portion may have an angular profile, rather than being curved in the direction of gas flow through the core duct. In the presently described embodiment, a single combination of a convex and non-convex portion is shown between a respective vane 54 and rotor blade 56. In other embodiments, additional arrangement of convex and non-convex portion may be provided between other respective pairs of a vane and a relatively downstream rotor blade. These additional convex and non-convex portions may be provided in the same compressor, or a different compressor (e.g. a convex portion may be provided in both the low and high pressure compressors).

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A core duct assembly for a gas turbine engine, the core duct assembly comprising:
   a core duct comprising an outer wall and an inner wall, the outer wall having an interior surface extending along a non-convex portion of the outer wall and a convex portion of the outer wall aft the non-convex portion, the non-convex portion including an upstream portion and a downstream portion, the downstream portion extending from the upstream portion to the convex portion of the outer wall, the core duct defining a gas flow path;
   a gas flow path member extending across the gas flow path at least partly between the inner wall and the outer wall, the gas flow path member having a trailing edge, wherein the upstream portion of the non-convex portion extends from the trailing edge to the downstream portion of the non-convex portion;
   a rotor blade located immediately downstream of the gas flow path member within the gas flow path, the rotor blade having a radial span extending from a blade platform to a blade tip,
   wherein a first upstream wall axis is defined as an axis tangential to the interior surface at a point on the downstream portion of the non-convex portion, the first upstream wall axis lying in a longitudinal plane of the gas turbine engine containing a rotational axis of the engine, wherein a second upstream wall axis is defined as an axis tangential to the interior surface at a point on the upstream portion of the non-convex portion, the second upstream wall axis lying in the longitudinal plane,
   wherein the first upstream wall axis extends at a first angle relative to an axis parallel to the rotational axis of the engine and the second upstream wall axis extends at a second angle relative to the axis parallel to the rotational axis of the engine, the first angle being greater than the second angle such that the downstream portion of the outer wall forms a ramp along the interior surface, and
   wherein the second upstream wall axis intersects a leading edge of the rotor blade at an intersection point spaced radially inward from the blade tip of the rotor blade, and the first upstream wall axis intersects the leading edge of the rotor blade radially inward of the intersection point.

2. A gas turbine engine for an aircraft comprising:
   an engine core comprising a turbine, a compressor, and a core shaft connecting the turbine to the compressor;
   a fan located upstream of the engine core, the fan comprising a plurality of fan blades;
   wherein the engine core comprises the core duct assembly of claim 1, wherein the rotor blade is a compressor rotor blade.

3. The gas turbine engine according to claim 2, further comprising a gearbox that receives an input from the core shaft and outputs drive to the fan so as to drive the fan at a lower rotational speed than the core shaft.

* * * * *